United States Patent
Cross et al.

(10) Patent No.: US 6,500,474 B2
(45) Date of Patent: Dec. 31, 2002

(54) MULTI-TEXTURED FOOD PRODUCT AND METHOD OF PRODUCING SAME

(75) Inventors: James C. Cross, Overland Park, KS (US); Andy Oxley, Roscoe, IL (US)

(73) Assignee: Kerry, Inc., Beloit, WI (US)

( * ) Notice: Subject to any disclaimer, the term of this patent is extended or adjusted under 35 U.S.C. 154(b) by 16 days.

(21) Appl. No.: 09/757,587

(22) Filed: Jan. 11, 2001

(65) Prior Publication Data

US 2002/0090421 A1 Jul. 11, 2002

(51) Int. Cl.[7] .............................. A23G 3/00; A23P 1/08
(52) U.S. Cl. .............................. 426/93; 426/98; 426/99; 426/289; 426/295; 426/303; 426/306; 426/307
(58) Field of Search .............................. 426/100, 303, 426/307, 289, 295, 285, 304, 305, 306, 93, 98, 99

(56) References Cited

U.S. PATENT DOCUMENTS

| | | | | |
|---|---|---|---|---|
| 3,958,021 A | * | 5/1976 | Cook | 426/268 |
| 4,038,427 A | * | 7/1977 | Martin | 426/285 |
| 4,055,669 A | * | 10/1977 | Kelly et al. | 426/307 |
| 4,328,253 A | * | 5/1982 | von Kamienski et al. | 426/100 |
| 4,562,079 A | * | 12/1985 | Herzing | 426/302 |
| 4,961,943 A | | 10/1990 | Blanthorn et al. | |
| 5,500,233 A | * | 3/1996 | Youcheff et al. | 426/100 |
| 6,017,571 A | | 1/2000 | Cross et al. | |
| 6,033,702 A | * | 3/2000 | Pedersen et al. | 118/13 |
| 6,103,279 A | * | 8/2000 | Ferrero | 426/100 |
| 6,110,515 A | * | 8/2000 | Clechet et al. | 426/100 |
| 6,194,014 B1 | * | 2/2001 | Busse | 426/249 |
| 6,214,394 B1 | * | 4/2001 | Beer | 426/100 |
| 6,242,022 B1 | * | 6/2001 | Bertrand et al. | 426/100 |
| 6,251,455 B1 | * | 6/2001 | Thomas | 118/667 |
| 6,251,456 B1 | * | 6/2001 | Maul et al. | 118/667 |
| 6,261,614 B1 | * | 7/2001 | Panaioli et al. | 426/99 |
| 6,335,041 B1 | * | 1/2002 | Baur et al. | 426/549 |
| 6,340,488 B1 | * | 1/2002 | French | 118/14 |
| 6,391,356 B1 | * | 5/2002 | Willcocks et al. | 426/306 |
| 6,391,373 B1 | * | 5/2002 | Kaiser et al. | 426/631 |

* cited by examiner

Primary Examiner—Carolyn Paden
(74) Attorney, Agent, or Firm—Birch, Stewart, Kolasch & Birch, LLP

(57) ABSTRACT

A multi-textured food product having a substantially continuous chunky coating. The food product has a central food piece, a thick solid or semi-solid fat-based coating covering the central food piece, and an exterior coating of particles having sizes in the range ⅛ inch through ¼ inch. The multi-textured food products are produced by (a) coating a food piece with at least 100 percent by weight of a liquid coating of at least one melted fat that is solid or semi-solid at room temperature and is capable of inhibiting moisture migration from the coated food piece, (b) bringing the coating to a solid or semi-solid state to form a pre-coated food piece, (c) coating this pre-coated food piece with a liquid coating comprising at least one melted fat that is solid or semi-solid at room temperature to form a liquid-coated pre-coated food piece, and (d) contacting the liquid-coated pre-coated food piece with chunky particulate matter to form a food product that is enrobed with a substantially continuous chunky coating.

7 Claims, 4 Drawing Sheets

MULTI-TEXTURED FOOD PRODUCT AND METHOD OF PRODUCING SAME

FIELD OF THE INVENTION

This invention relates to multi-textured snack pieces or cereal inclusions. These multi-textured food products comprise centers enrobed with milk chocolate-like matrices. The enrobed matrices are then encased in a third textural component, which may include large particles adhered to the surface of the product, creating a natural, bumpy appearance. In accordance with the present invention, each of the textural components in the multi-textured food product retains its unique mouth feel over time. This invention also provides methods of manufacture that permit a large number of formula variations.

BACKGROUND OF THE INVENTION

Shelf stable food products having multiple textures and moisture contents—at reasonable cost—are wares of major importance in the food industry. The cereal industry in particular has struggled with the storability of multiple texture and moisture food pieces in products. Today, as more people look for nutritious and palatable easy-to-eat "finger food", the issue of multiple textures is more important than ever.

Barrier coating technology is well developed in general in the food industry. Many types of barriers have been devised and applied to prevent migration of moisture and fat through multiple component foodstuffs. These barriers range from cellulose gums to shellac and various liquid or hard fats. Although all of these barriers provide some degree of acceptable performance, each has shortcomings in appearance and/or flavor. For instance, cellulose gums and shellac both leave gritty film-like pieces in the mouth of the consumer, and hard butter or oils, such as hydrogenated fats, cause a white or gray appearance and have waxy textures.

The more successful attempts at multiply textured shelf stable foods, prior to this invention, have come from the confectionery industry (e.g., SNICKERS candy bars) or the snack food industry using co-extrusion technology (e.g., COMBOS). In both of these cases, foods having multiple textures are produced by selecting components similar in moisture content, that is, by controlling water activity. The candy bar, however, by virtue of its meltability, is not truly shelf stable, and most co-extruded products have an undesirable machined appearance.

U.S. Pat. No. 4,961,943 (Blanthorn) teaches a process for manufacturing multi-texture stable products for use in cereal or snack applications. The primary focus of the Blanthorn teaching is elimination of moisture transfers by multiple applications of fat over a semi-moist center, typically a raisin. Blanthorn teaches that alternating applications of oil with applications of granulated sugar (blends of sugar and ground cereal) during this process will create unique crunchy texture, thus making the waxy coating more palatable. The patent teaches, furthermore, that a final oil coat followed by the application of small pieces of nuts or ground cereal will improve the appearance of the final product.

Due to the lack of viscosity of the medium taught by Blanthorn, that is, of oil, only extremely small sized particles will adhere to the final coating. Consequently, the appearance of the final product is unappetizing. The Blanthorn products also have a gritty texture, due to the use of granulated sugar.

The present invention has as an objective the production of foodstuffs that have moisture retention results similar to those obtainable by the Blanthorn procedure, but having more appetizing blends of textures and flavors. The present invention eliminates the unappetizing attributes of the Blanthorn products while at the same time providing unique means to deliver desirable vitamins and minerals in a palatable finger food or snack. Moreover, because the outer coatings of products produced in accordance with the present invention are dry, foodstuffs of this invention may also be included in packaged breakfast cereals.

SUMMARY OF THE INVENTION

The present invention relates to multi-textured food products, such as snack pieces and cereal inclusions. Products of this invention typically have soft or moist inner centers with crunchy or drier outer shells. Such foodstuffs provide an excellent means for delivering vitamins and minerals in a palatable food with visual appeal. Products of this invention may be configured as snack or finger food. Alternatively, they may be configured for inclusion into containers of breakfast cereals. The present invention provides unique shelf stable products with excellent eye appeal, incorporating a sugar, fat, and flavor barrier that allows for the delivery of relatively high moisture centers.

This invention also provides methods of manufacture that permit a large number of formula variations, both with respect to the centers of the food products and with respect to their coatings.

The multi-textured food product of the present invention has a substantially continuous chunky coating. The food product has a central food piece, a thick solid or semi-solid fat-based coating covering the central food piece, and an exterior coating of particles having sizes in the range ⅛ inch through ¼ inch. The multi-textured food products are produced by (a) coating a food piece with at least 100 percent by weight of a liquid coating of at least one melted fat that is solid or semi-solid at room temperature and is capable of inhibiting moisture migration from the coated food piece, (b) bringing the coating to a solid or semi-solid state, for example by contacting the coated food piece with cold air, to form a pre-coated food piece, and (c) coating this pre-coated food piece, for example at a temperature of 110–125° F., with a liquid coating comprising at least one melted fat that is solid or semi-solid at room temperature to form a liquid-coated pre-coated food piece. Coating step (c) may be accomplished by flowing a fat-based milk chocolate-like material having a viscosity of 5000–20,000 cps over pre-coated food pieces. Finally, in step (d), the liquid-coated pre-coated food piece is contacted with chunky particulate matter preferably comprising particles having sizes in the range ¹⁄₁₆ inch through ¼ inch—to form a food product of the present invention, enrobed with a substantially continuous chunky coating.

DETAILED DESCRIPTION OF THE INVENTION

The Products

Figure 4:
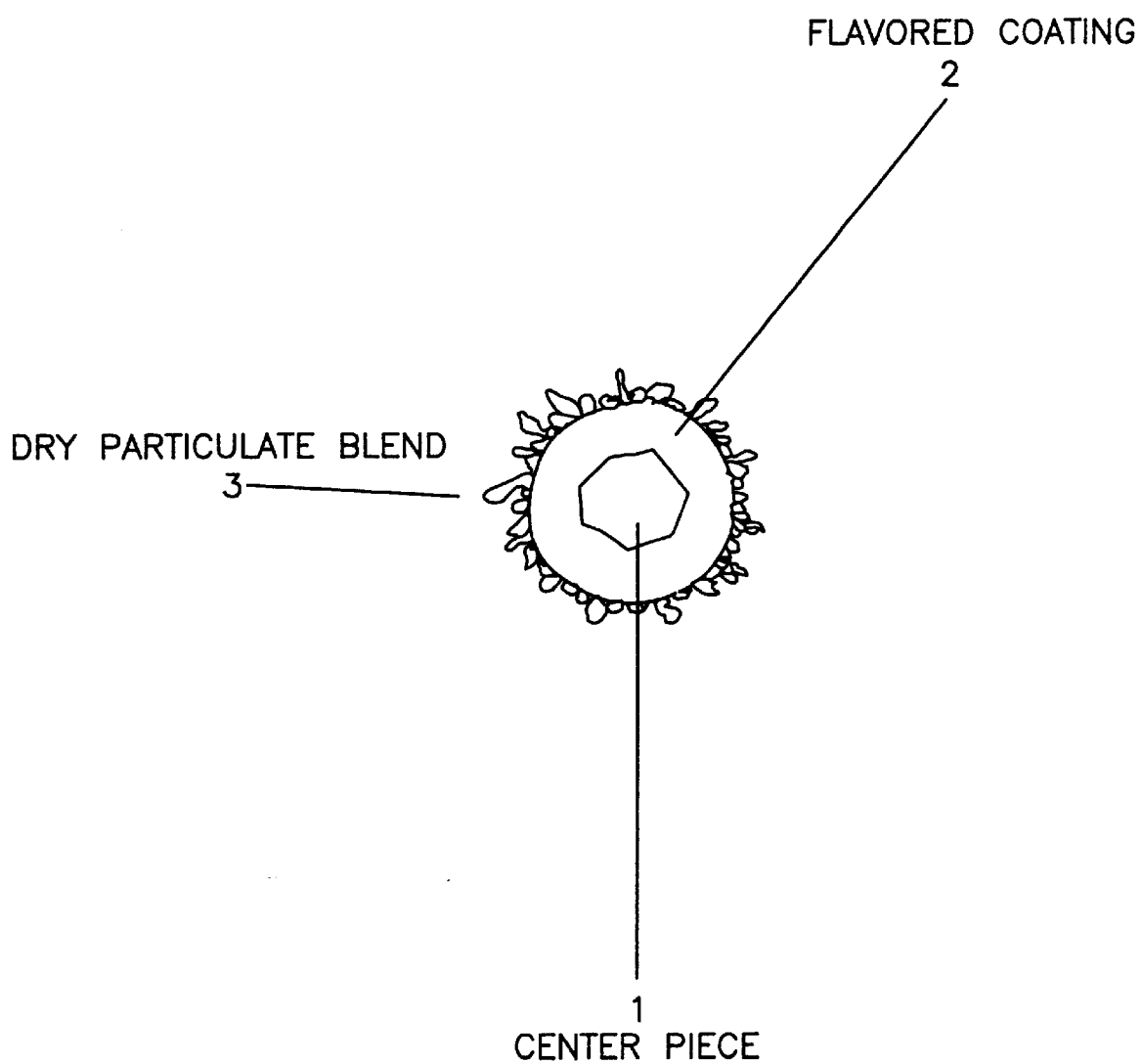
FIG. 4 provides a cross-sectional view of a product of the present invention.

Referring to FIG. 4, the soft or moist inner centers 1 of the present invention may include such edible items as real fruit pieces, fruit gum pieces, glycerinated soft extruded pieces, and other fat-based soft textured matrices. Non-limiting specific examples of center material includes: partially dried fruit, such as raisins and dates; expanded cereal pieces, such as puffed corn and wheat; nuts; partially dried meat pieces, such as beef jerky; meat analog pieces, such as those produced by extruding soy/wheat protein complexes; and small pieces of cheese. Even low or no moisture fat-based pieces, as described in U.S. Pat. No. 6,017,571 (Cross et al.), work extremely well in the present invention.

Moisture content of the center material can vary widely. Almost any dry foodstuff will work, but a center material that is too moist to have self-sustaining structure would not work well in the present invention. The product's shelf life is shortened as the moisture content of the center is increased. Preferably, the center 1 should be chosen to be of a soft enough nature, relative to the coating, to permit facile detection of textural differences within the food product of the invention.

A coating 2 made by roller refining a blend of fat and flavoring ingredients surrounds the center in accordance with the present invention. This inner coating 2 generally has a milk chocolate-like consistency. The flavoring ingredients include, for instance, spray dried powders including maltodextrins, milks, butter, cheeses, and fruits, as well as a number of different sugars. Due to the wide varieties of materials that can be used to formulate these coatings, they may be produced in a wide range of colors and flavors. They may be of a savory nature, for instance, cheese made with spray dried cheese) or coffee (made with freeze dried coffee). They can be any variety of fruit or chocolate, or can simply be a sweet creamy confection-like coating. Vitamins and/or minerals can be added to the refined coating to enhance the nutritional value of the food.

Refining these flavoring ingredients with the fat not only provides a pleasant mouth feel, but also allows for viscosity modification of the coating layer. The manufacture of these coating materials may be accomplished by methods described in U.S. Pat. No. 6,017,571, the entire disclosure of which is hereby expressly incorporated by reference.

The outermost layer of food pieces produced in accordance with the present invention comprises a layer 3 of dry material, preferably with pieces therein of a large enough size to make them readily identifiable to the eye. Typical sizes range from 1/16 to 1/4 inch. Examples of such dry material include, for instance, whole rolled oat pieces, crisped rice pieces, graham cracker pieces, or small bits of dehydrated apple. Such pieces can be used homogeneously or blended in any combination in the layer 3.

The ability to use blend of multiple flavors (from the inner coating) and textures (from the outer coating) permit enormous variations in the formulations and potential uses of food pieces produced in accordance with this invention.

Production

In accordance with the present invention, the centers are coated in two steps. In the first step, the centers are loaded into a revolving pan or drum which is continuously blasted with cool air, and the refined chocolate-like fat based coating is sprayed into the revolving pan or drum. At this stage, vitamins and/or minerals may optionally be added as a fine powder. Alternatively, any vitamins and/or minerals may be pre-added to the refined chocolate-like fat based coating. Pre-coated centers are continuously removed from the revolving pan or drum. The pre-coated centers typically comprise 40 weight-% center and 60 weight-% coating down to 20 weight-% center and 80 weight-% coating.

These pre-coated centers are delivered to an enrobing station, where the second step of coating takes place. The refined chocolate-like fat based coating at a temperature of 110–125° F. is applied to the pre-coated centers, which are then immediately (that is, before the coating solidifies) treated with the particulate material. The coating conveniently may be applied at this stage by, for instance, a coating waterfall.

Figure 1:
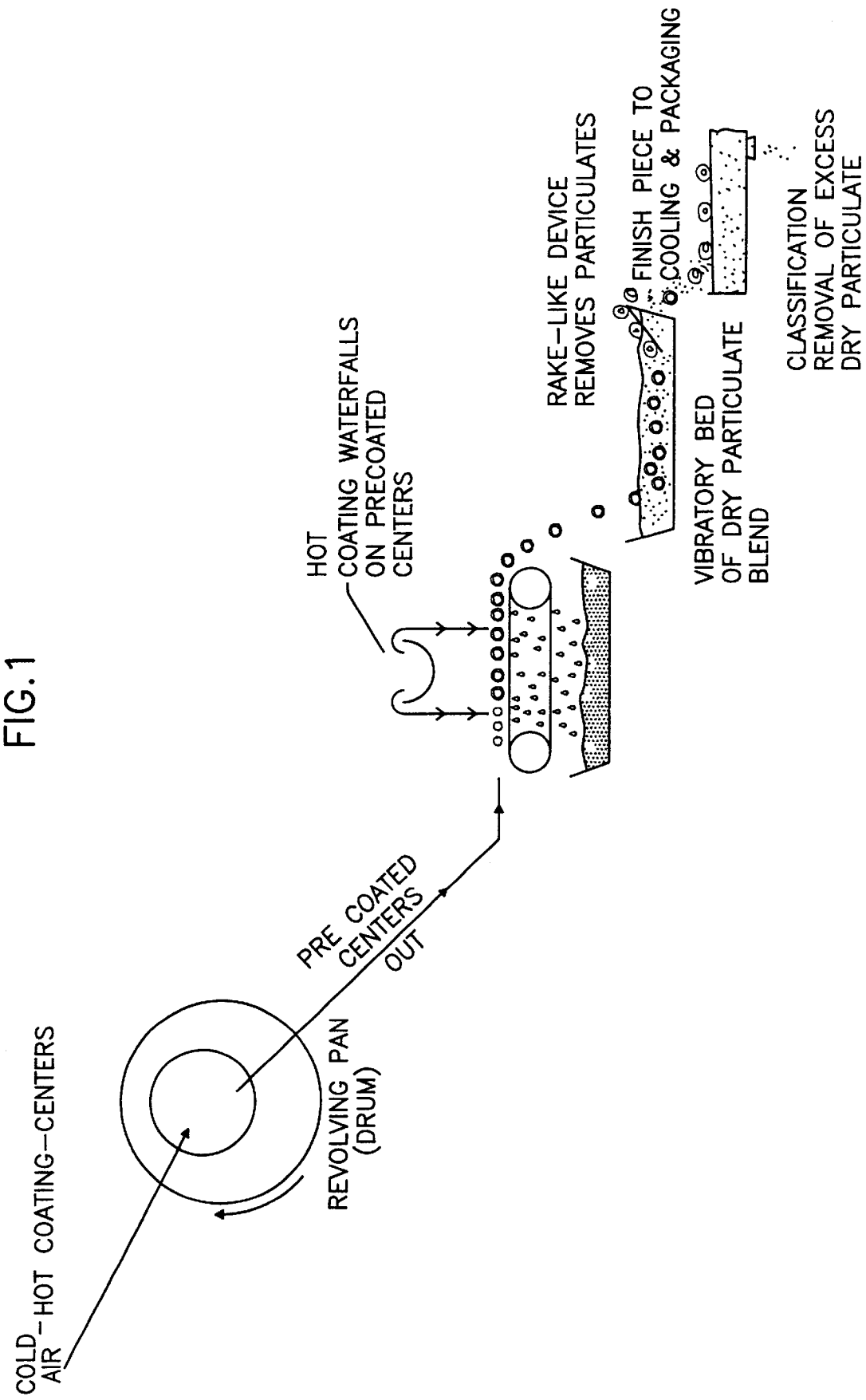
FIG. 1 is a schematic illustration of a first manufacturing embodiment of the present invention.
Figure 2:
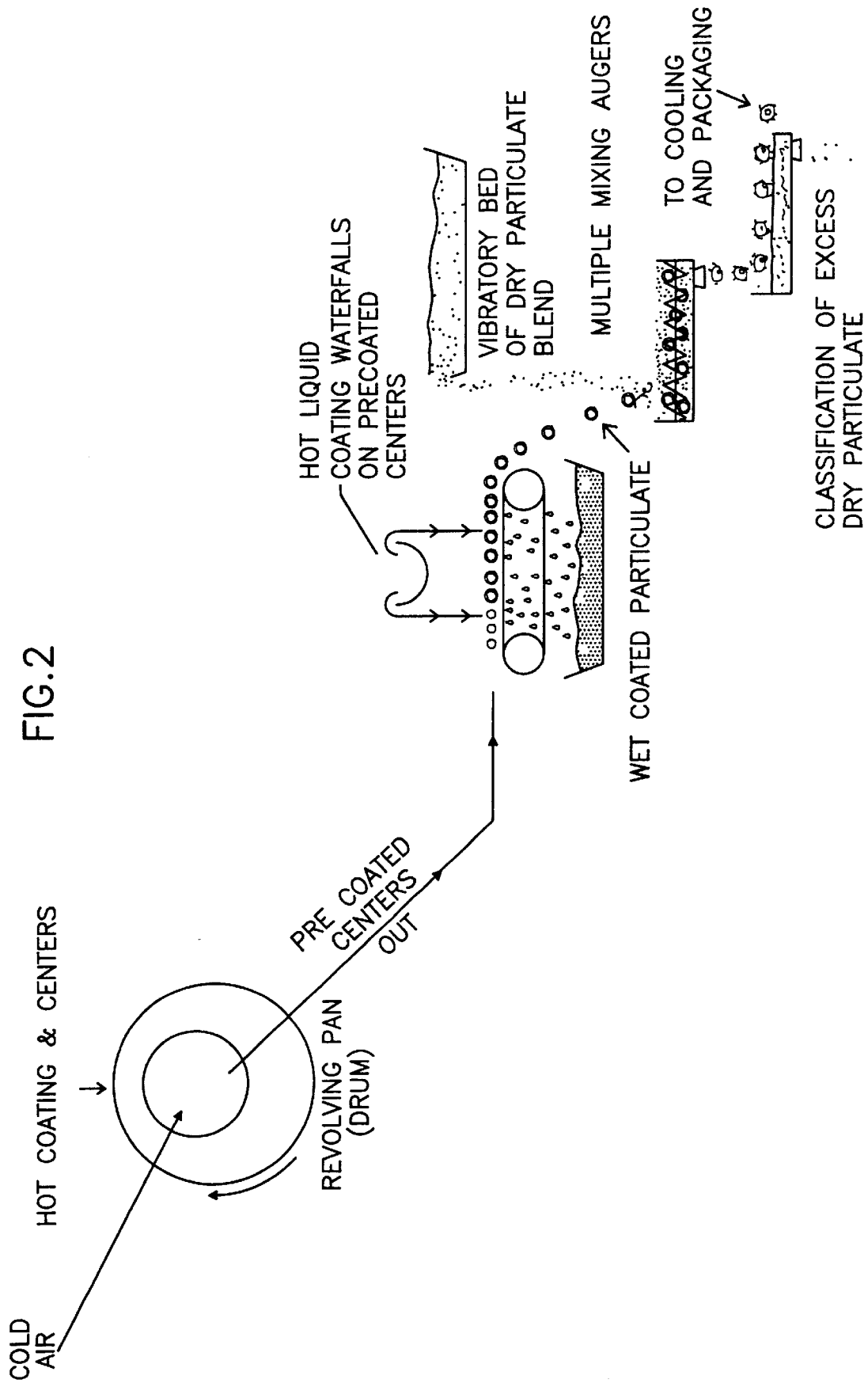
FIG. 2 is a schematic illustration of a second manufacturing embodiment of the present invention.
Figure 3:
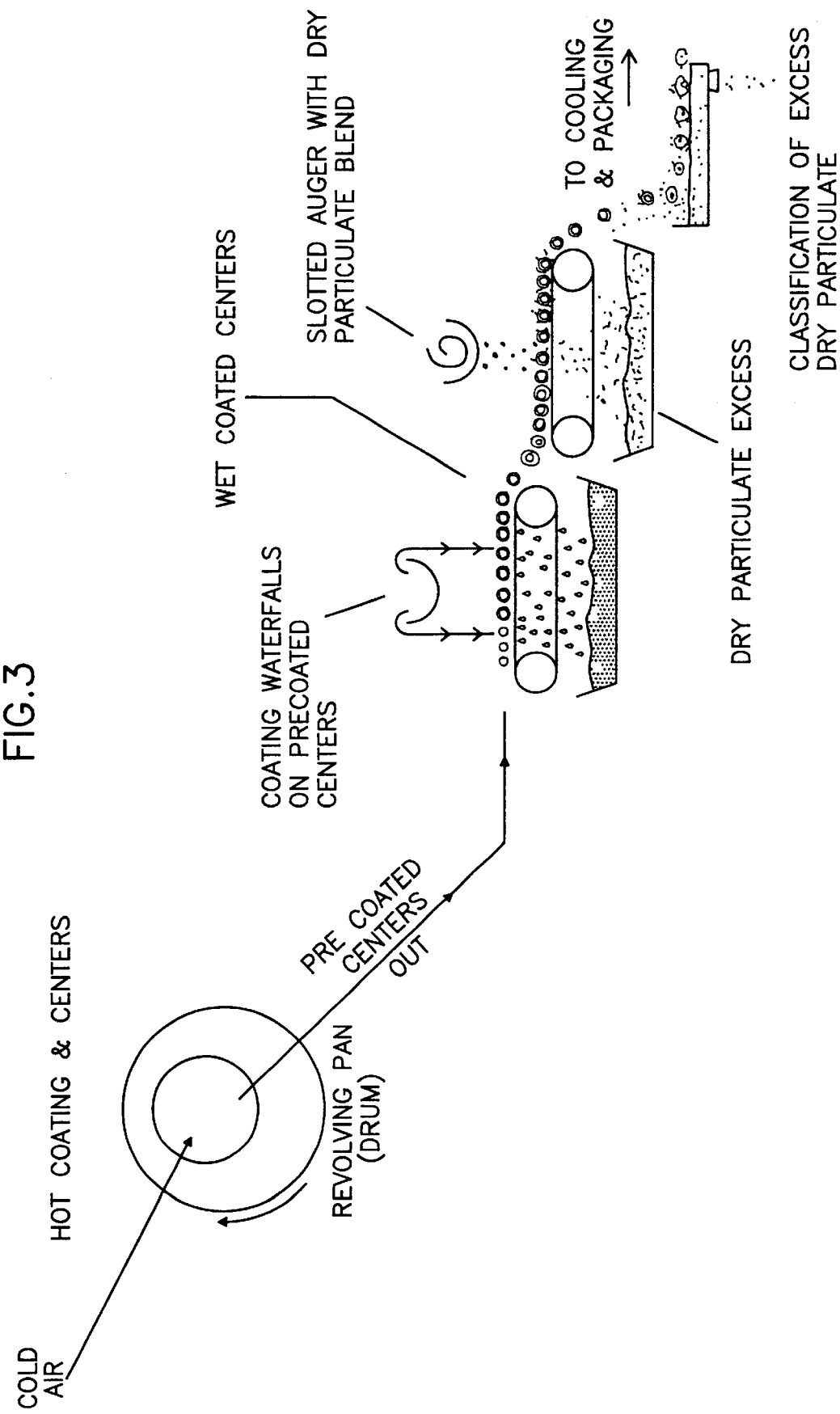
FIG. 3 is a schematic illustration of a third manufacturing embodiment of the present invention.

There are several convenient ways in which the particulate material can be incorporated into the food pieces of the present invention. One way makes use of a vibratory bed of dry particulate material. The wet coated centers fall into the bed and drop to its bottom, picking up particles, then rise to the surface where they are extracted by comb-like devices. See FIG. 1. Another way makes use of a vibratory "waterfall" of dry particles, the particles being shaken onto the wet coated centers. See FIG. 2. A third way makes use of a slotted auger to "waterfall" the dry particles onto the wet coated centers. See FIG. 3. In these latter two approaches, series of augurs move the mass of particles and centers away from the enrober station, where they are cooled, sifted, and packed.

EXAMPLE 1

A food product according to this invention was prepared having an extruded blueberry center, a vanilla-flavored coating, and a chunky outer coating comprised of ground cornflakes, crisp rice, and toasted oats. The vanilla-flavored coating consisted of 67.4 wt-% granulated sugar, 0.1 wt-% vanilla flavor, 31 wt-% hydrogenated palm kernel oil, 0.5 wt-% soybean lecithin, and 1 wt-% hydrogenated palm stearine. This vanilla-flavored coating had a viscosity of approximately 15,000 cps at 120° F. The chunky outer coating consisted of 25 wt-% Kellogg's No. 12 cornflakes, 15 wt-% densified crisp rice, and 60 wt-% toasted baby oats.

EXAMPLE 2

A food product according to this invention was prepared having a cinnamon chip center, a vanilla-flavored coating, and a chunky outer coating comprising toasted oats. The cinnamon chip center was approximately 3/8"×5/16"×5/16" in size. It was made of 64.34 wt-% granulated sugar, 2.04 wt-% powdered nonfat milk, 5.92 wt-% cinnamon spice, 2.04 wt-% hydrogenated soybean stearine, 25.46 wt-% hydrogenated soybean and cottonseed oils, and 0.2 wt-% soybean lecithin. The cinnamon chip was prepared using non-lauric fat in order to avoid rancidity problems that occur with laurics and cinnamon. The vanilla-flavored coating consisted of 59.38 wt-% granulated sugar, 5.1 wt-% powdered nonfat milk, 2.08 wt-% hydrogenated soybean stearine, 32.7 wt-% hydrogenated soybean and cottonseed oils, 0.53 wt-% soybean lecithin, 0.1 wt-% vanilla flavor, and 0.11 wt-% red food coloring. This vanilla-flavored coating had a viscosity of approximately 8000 cps at 120° F. The food product of this invention prepared in this Example consisted of 40 wt-% cinnamon chip center, 50 wt% vanilla-flavored coating, and 10 wt-% toasted baby oats.

EXAMPLE 3

A food product according to this invention was prepared having a puffed corn cereal piece center pre-coated with a sour cream and onion coating containing crushed potato chips and potato flakes and enrobed with a sour cream and onion coating bearing broken potato chip pieces. The sour cream and onion coating consisted of 39.184 wt-% sour cream and onion dip mixture, 16.653 wt-% maltodextrin sweetener, 41.959 wt-% hydrogenated soybean and cottonseed oils, 0.572 wt-% soybean lecithin, and 1.632 wt-% hydrogenated soybean lecithin. The pre-coated centers in this Example consisted of 54.517 wt-% of this sour cream and onion coating, 11.214 wt-% ⅜ medium 72015 potato flakes, 3.115 wt-% medium small fines soybean, 23.363 wt-% corn puffs, and 7.788 wt-% potato chips crushed through a #5 square hole screen. The final product in this Example consisted of 70 wt-% of those pre-coated centers, 20 wt-% of the sour cream and onion coating, and 10 wt-% broken potato chip pieces.

COMPARISON

The present process blends oil, sugar, other powders, flavor, and the like, and then refines the product into a milk chocolate-like mass. This is applied in one major application step, which provides improved texture. In contrast, U.S. Pat. No. 4,961,943 (Blanthorn) teaches alternative applications of oil and sugar.

Blanthorn teaches drying by alternative application of dry materials. The present invention employs cool air to dry the coating product in the major application coating application step, then adds a wet (not dried) layer of the coating to the center to be treated with particles and treats it with particles while the second coating application is still wet. This procedure, along with the greater viscosity of the present coating, enables larger pieces to adhere to the coating. Blanthorn teaches adhered piece particle sizes of 1/32–1/16 inch. The present invention prefers particle sizes of 1/16 up to ¼ inch.

Blanthorn teaches fruit centers. The present invention extends to any number of center variants, including not only fruit but also, e.g., chocolate chips, cheese, meat analogs, extruded puffed corn, and so on. Blanthorn teaches a 50:50 center to coating weight ratio. In the present invention, the coating typically weighs approximately twice as much as the center employed. Blanthorn teaches a single step process, which is either a pan or an augur method. The present invention requires that the product first be pre-coated in a revolving pan or drum. That coating is crystallized, then the product is sent through, e.g., a waterfall of fat based chocolate-like material with a viscosity of 5000–20,000 cps at, e.g., 120° F. The product is then sent "wet" into a bath of dry fines, and the product can then be augured to a classifier with the fines, or moved on a belt through the fines (similarly to a typical breading apparatus for fired foods) or allowed to vibrate across a thick bed of fines and ultimately sifted out and packaged.

While certain particular embodiments of the present invention have been described and illustrated above, it will be clear to those skilled in the art that other, different embodiments of the invention may be produced that will likewise fall within the spirit and scope hereof.

What is claimed is:

1. A process for producing a multi-textured food product having a substantially continuous chunky coating enrobing the product, said process comprising the steps of:

(a) coating a food piece with a liquid coating having a viscosity of 5000–20,000 cps at 120° F., said coating comprising a blend of a flavoring ingredient and at least one melted fat that is solid or semi-solid at room temperature, wherein the said liquid coating composition is employed in an amount that weighs at least as much as said food piece and that is capable of inhibiting moisture migration from the coated food piece, (b) bringing said coating to a solid or semi-solid state to form a precoated food piece, (c) coating said pre-coated food piece with a liquid coating comprising at least one melted fat that is solid or semi-solid at room temperature to form a liquid-coated pre-coated food piece, and (d) contacting said liquid-coated pre-coated food piece with chunky particulate matter to form a food product enrobed with a substantially continuous chunky coating.

2. The process of claim 1, in which step (b) is accomplished by contacting the coated food piece with cold air.

3. The process of claim 1, in which the liquid coating of step (c) is applied at a temperature of 110–125° F.

4. The process of claim 1, in which the liquid coating of step (c) is applied by flowing a fat-based refined viscous material over pre-coated food pieces.

5. The process of claim 1, in which the chunky particulate matter of step (d) comprises particles having sizes in the range 1/16 inch through ¼ inch.

6. The product of the process recited in claim 1.

7. A multi-textured food product having a substantially continuous chunky coating comprising a central food piece, a coating covering said food piece, said coating having a viscosity of 5000–20,000 cps at 120° F. and comprising a solid or semi-solid fat-based ingredient and a flavoring ingredient and said coating weighing at least as much as said food piece, and an exterior coating comprising particles having sizes in the range ⅛ inch through ¼ inch.

* * * * *